United States Patent [19]

Kuhrdt

[11] Patent Number: 4,682,172
[45] Date of Patent: Jul. 21, 1987

[54] ANTENNA SYSTEM FOR A FLYING BODY FOR JAMMING RADIO TRANSMITTING AND RECEIVING DEVICES

[75] Inventor: Günther Kuhrdt, Elchingen, Fed. Rep. of Germany

[73] Assignee: Licentia Patent-Verwaltungs-GmbH, Frankfurt, Fed. Rep. of Germany

[21] Appl. No.: 683,563

[22] Filed: Dec. 19, 1984

[30] Foreign Application Priority Data

Dec. 21, 1983 [DE] Fed. Rep. of Germany ....... 3346155

[51] Int. Cl.$^4$ ............................ G01S 7/38; H04K 3/00
[52] U.S. Cl. ......................................... 342/15; 455/1
[58] Field of Search ...................... 343/7.5, 18 E, 374, 343/403, 406, 756; 455/1; 342/13, 14, 15; 374/403, 406

[56] References Cited

U.S. PATENT DOCUMENTS

| | | | |
|---|---|---|---|
| 3,044,063 | 7/1962 | Russell | 343/374 |
| 3,720,952 | 3/1973 | Lawsine | 343/18 E |
| 3,764,999 | 10/1973 | Simons et al. | 343/18 E X |
| 3,879,732 | 4/1975 | Simpson | 343/18 E |
| 3,916,416 | 10/1975 | Lewis | 343/756 |
| 4,217,580 | 8/1980 | Lowenschuss | 343/18 E |
| 4,247,946 | 1/1981 | Mawhinney | 455/1 |
| 4,267,596 | 5/1981 | Lowenschuss | 455/1 X |
| 4,357,709 | 11/1982 | Butler et al. | 455/1 X |

OTHER PUBLICATIONS

"Modulation", McGraw-Hill Encyclopedia of Science and Technology; (vol. 8, pp. 644–647; 1982).

Primary Examiner—T. H. Tubbesing
Assistant Examiner—Bernarr Earl Gregory
Attorney, Agent, or Firm—Spencer & Frank

[57] ABSTRACT

An antenna system for a flying body for jamming radio/radar signal transmitting and receiving devices. The antenna system includes a receiver with a frequency discriminator, a transmitter with a variable frequency oscillator, a transmit/receive device for conducting signals to the receiver and for conducting the transmitter signal to the antennas, a switch for selectively or cyclically connecting the antennas to the receiver and transmitter, a time which enables the receiver device to receive signals from antennas during one complete cycle of the switch and which enables the transmitter during the subsequent transmit mode to furnish transmitter signals to selected antennas for at least one complete cycle of the switch and a memory in which frequency representations are stored so that each representation corresponds to a particular antenna via which signals were received.

9 Claims, 1 Drawing Figure

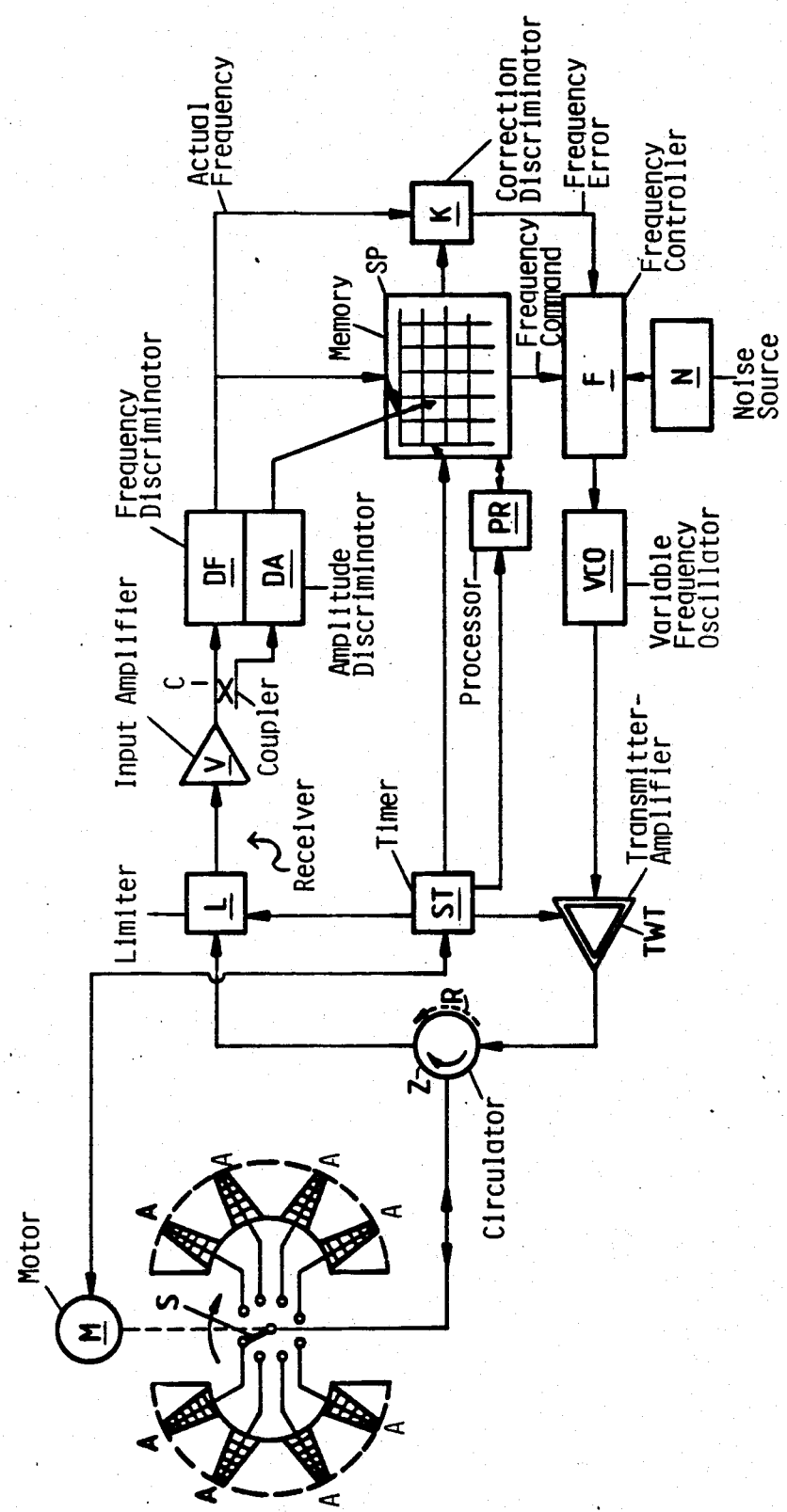

ANTENNA SYSTEM FOR A FLYING BODY FOR JAMMING RADIO TRANSMITTING AND RECEIVING DEVICES

BACKGROUND OF THE INVENTION

The present invention relates to an antenna system for a harassment-type flying body for jamming of signal transmitting and receiving devices, especially ground-based radars, which will henceforth be called "target systems".

In contradistinction to a ground-based jamming device, a jamming device in a small flying body is subject to great restrictions with respect to weight, space and power requirements. Such restrictions considerably limit the complexity of the mechanisms and design of a flying body jamming device, as well as the available transmitting power. Moreover, due to its flying movement, the relative position of the flying body constantly changes with respect to the devices to be jammed. A fixed alignment of the flying body antenna with respect to any one of such sites is thus hardly achievable.

SUMMARY OF THE INVENTION

It is an object of the present invention to provide an antenna system for a flying body of a harassment type defined above which, with simple design, is suitable for jamming a plurality of simultaneously operated target systems.

The above and other objects are accomplished by the invention in which an antenna system is provided for a flying body for jamming signal transmitting and receiving devices, comprising:

a plurality of individual signal transmit/receive antennas each having a directional radiation pattern which covers a different azimuth sector when the flying body is in its normal flight attitude;

a common receiver having an input for receiving signals from said antennas and including frequency discriminating means for producing representations of the frequencies of respective received signals;

a common transmitter including a variable frequency oscillator having a frequency control input and an RF output, a frequency control means having an output connected to said frequency control input and a frequency command input; said common transmitter producing a transmitter signal which is an essentially linear amplification of the RF signal produced by the frequency oscillator;

transmit/receive means connected to said common receiver and to said common transmitter for conducting signals received by said antennas to said common receiver and for conducting the transmitter signal from said common transmitter to said antennas;

switch means connected to said transmit/receive means for selectively or cyclically connecting said antennas to said common receiver and to said common transmitter via said transmit/receive means;

timer means connected to said common receiver, said common transmitter and said switch means, said timer means having alternating receive and transmit modes, said timer means enabling said common receiver during the receive mode to receive signals from any of the selected said antennas during one complete cycle of said switch means and enabling said common transmitter during the transmit mode for furnishing transmitter signals to any of the selected said antennas for at least one complete cycle of said switch means; and memory and processor means being connected for storing the frequency representations from said frequency discriminator means and having an output connected to the input of said frequency control means such that each stored frequency representation corresponds to one of said antennas via which signals were received; said memory means, during a given transmit mode, feeding frequency commands to said frequency control means which correspond to the antenna currently connected to said common transmitter and which were stored as frequency representations during the previous receive mode, wherein said frequency control means is responsive to the frequency command received at its input for tuning said variable frequency oscillator to the frequency indicated by that frequency representation.

Due to the frequency and directional selectivity of the radiation in conjunction with antenna switching, jamming is producted at high effective radiated power and minimum expense which results in a considerable increase of the false alarm rate of the jammed target systems operated within a large area and hence a corresponding reduction of their signal detection probability or accuracy.

If a plurality of target systems exist, it is possible, under certain circumstances, that signals from a plurality of such systems are received and detected simultaneously within one azimuth sector, i.e. by one antenna. In such a case, it will usually be of advantage, in the interest of an effective jamming strategy, to limit the jamming in this sector to the frequency channels which are detected at greatest amplitudes. On the other hand, a single emission may be detected in a plurality of azimuth sectors due to the reception of side lobes. In the interest of the suppression of side lobes, it is therefore of advantage to compare the amplitudes of signals received at the same frequency from different azimuth sectors and to respond only to one or two of the strongest signals. For this purpose, and in accordance with a further aspect of the invention, an amplitude discriminator is provided in the receiver of the flying body. The max. values of signal amplitudes received for any frequency slot and any direction are stored in a memory matrix until the end of the current receive phase. Then those stored values which, according to the above described principle are not intended to actuate jamming signals, are cancelled before the transmit phase begins. For this purpose, and according to another aspect of the invention, the memory is advantageously organized in the form of a matrix with the antenna number as the row address and the frequency as the column address. The number of columns results from the resolution of the frequency determination. If, for example, the frequency is indicated by the frequency discriminator in the form of an 8-bit digital word, a maximum of 256 frequency columns must be held available in the memory according to 256 frequency slots. Before each new receive phase, the memory is cleared.

BRIEF DESCRIPTION OF THE DRAWINGS

The sole FIGURE is a block circuit diagram of an antenna arrangement including a plurality of transmit/receive antennas connected in accordance with the invention.

DESCRIPTION OF THE PREFERRED EMBODIMENT

Referring to the FIGURE, eight individual transmit/receive antennas A of the antenna arrangement, which are preferably provided in the form of printed log-periodic dipoles in a known manner, are switched by means of a mechanical switch S which is driven by a motor M. If the switch rotates e.g. at a frequency of 1500 rpm, a sampling frequency of 25 Hz will correspond to a revolution duration of 40 ms, so that during one revolution each antenna A is in operation for 5 ms. A timer ST, which is synchronized by motor M, feeds control gates to a limiter L at the front end of a receiver (generally denoted by the arrow in the Figure) and a transmitter amplifier TWT switches the system into the receive mode for one revolution of the switch ("look through") and thereafter, for one or a plurality of revolutions, into the transmit mode. Alternatively, electronic switching means, for example an array of PIN diodes, can be provided as switching devices in lieu of mechanical switches, for actuation by timer ST.

The switching of a plurality of antennas in a jamming system is well known to those skilled in the art and is e.g. described in DE 31 06 032 A1.

During the receive mode, the transmitter amplifier TWT is disabled and the receiver input at limiter L is enabled. Received signals reaching the receiver from the antennas A via circulator Z are fed via input amplifier V to frequency discriminator DF and, via a coupler C, to amplitude discriminator DA. An embodiment of the required digital frequency discriminator DF is commercially available as "Mini-IFM" (Instantaneous Frequency Measurement) device from ANAREN ranging from 4 to 12 bit output. Amplitude discriminator DA is a standard A/D voltage converter.

The frequency discriminator DF feeds the digital equivalent of the instantaneous signal input frequency to the memory SP in e.g. the form of an 8-bit word.

Memory SP is part of a standard microprocessor and is organized in the form of a two-dimensional matrix. According to the output information obtained from the digital frequency discriminator DF, each word addresses the memory column corresponding to the respective frequency. The memory is also connected to timer ST from which it receives the number of the presently connected antenna as row information. The amplitude value determined by the amplitude discriminator DA is written into the memory in the form of a 4-bit word in the determined row and column location. For successive amplitude inputs into the same matrix element, only the max. value will be maintained.

At the end of one receive mode and before the beginning of the transmit mode, the contents of matrix memory SP is processed in two passes by its processor PR. Within a column, all amplitude values but the one or two highest out of a plurality of amplitude entries are cancelled such as to eliminate the influence of adjacent sector or side lobe radiation. Within a row, the number of listings will be limited, e.g., to the "Top 4" corresponding to the four channels having the highest amplitude entries. The remaining channels will subsequently be jammed in time-sharing.

During the transmit mode, transmitter amplifier TWT is gated on and the transmitted signal is fed, via circulator Z, to the presently connected antenna A. For this antenna, the associated row of the matrix memory is read out as a frequency command instruction to digital frequency controller F controlling the frequency of the output of variable frequency oscillator VCO. If there is a plurality of memory values in a row which are read out, the transmitting period is time shared among the different frequencies. The dwell time in each individual frequency channel may be weighted according to the recorded amplitude values so that targets at a favorable aspect angle can be jammed particularly effectively. For every command frequency, precise VCO tuning is accomplished in a closed servo loop.

Circulator Z has a residual coupling R which couples a sample of the transmitted signal to the DF device, thus forming the "actual frequency" input into the servo loop. During the transmit mode the receiver will be blocked by the gated limiter L, whose finite attenuation (say 40 dB) allows entering of a transmitter output sample into the receiver, however. An error discriminator K compares the frequency value determined for the transmitter signal sample coupled to the receiver against the "frequency command" input from the matrix memory and generates a correction signal if there is a deviation. The correction signal is fed back to the frequency controller F, forming a control loop for digital fine tuning of the carrier frequency of the variable frequency oscillator VCO in order to match it to the command frequency as read out of memory SP.

A signal from a noise source N or any other suitable wave form generator can be AM/FM modulated on the oscillator carrier for the purpose of broadening the spectrum.

What is claimed is:

1. An antenna system for a flying body for jamming radio transmitting and receiving devices, comprising:
    a plurality of individual signal transmit/receive antennas each having a directional radiation pattern which covers a different azimuth sector when the flying body is in its normal flight attitude;
    a command receiver having an input for receiving signals from said antennas and including frequency discriminating means for producing representations of the frequencies of respective received signals, and further including amplitude discriminator means for producing representations of the amplitudes of the respective signals as received via one of the antennas;
    a common transmitter including a variable frequency oscillator having a frequency control input and an RF output, a frequency control means having an output connected to said frequency control input and a frequency command input, said common transmitter producing a transmitter signal which is in essentially linear amplification of the RF signal produced by the frequency oscillator;
    transmit/receive means connected to said common receiver and to said common transmitter for conducting signals received by said antennas to said common receiver and for conducting the transmitter signal from said common transmitter to said antennas;
    switch means connected to said transmit/receive means for selectively or cyclically connecting said antennas to said common receiver and to said common transmitter via said transmit/receive means;
    timer means connected to said common receiver, said common transmitter and said switch means, said timer means having alternating receive and transmit modes, said timer means enabling said common receiver during the receive mode to receive signals from any of the selected antennas during one complete cycle of said switch means and enabling said common transmitter during the transmit mode for furnishing transmitter signals to any of the selected antennas for at least one complete cycle of said switch means; and memory and processor means being connected for storing the frequency representations from said frequency discriminating means and having an output connected for supplying stored frequency representations to said frequency command input of said frequency control means such that each stored frequency representation corresponds to one of said antennas via which signals were received, said memory means having storage locations for storing amplitude representations, said memory means being organized as a two-dimensional matrix having rows corresponding to the respective antennas and columns corresponding to respective received signal frequency values, wherein the amplitude representations produced during a receive mode are each stored in a respective memory location defined by the column corresponding to the frequency of the received signal and the row corresponding to the antenna via which this signal is received, said memory means, during a given transmit mode, feeding frequency representations to said frequency command input of said frequency control means which correspond to the antenna currently connected to said common transmitter and which were stored as frequency representations during the previous receive mode, said processor means evaluates the amplitude representations stored in each column of said memory means and preserves only a selected number of amplitude representations representing the highest amplitude values stored in each column and deletes the rest, the selected number of amplitude representations being less than the total number in the respective column, the evaluating and deleting occurring between a receive mode and a subsequent transmit mode, and wherein said frequency control means is responsive to the frequency representation received at its frequency command input for tuning said variable frequency oscillator to the frequency indicated by that frequency representation.

2. A system as defined in claim 1, wherein said processor means further evaluates the amplitude representations stored in each row of said memory means and limits the number of stored amplitude representations to a given number of highest amplitudes in each row and deletes the rest, the evaluating and deleting occurring between a receive mode and a subsequent transmit mode.

3. A system as defined in claim 13, wherein said frequency control means includes a waveform generator for broadening the spectrum of the transmitter signal.

4. A system as defined in claim 1, wherein said switch means is a mechanically rotating switch operating at a constant angular velocity, which, during the transmit and receive modes, connects said antennas to said common transmitter and said common receiver, respectively, for identical-length and constant time periods.

5. A system as defined in claim 4, wherein the transmit mode includes a plurality of successive switch revolutions.

6. A system as defined in claim 1, wherein a multitude of signals received via one of said antennas may represent a plurality of frequencies, and said frequency discriminating means then produce a corresponding plurality of frequency representations which are stored in a row of said memory means as a multitude of frequency entries and wherein said frequency control means controls said variable frequency oscillator to produce a plurality of transmitter signals of different frequency in time sharing within the same transmit period.

7. A system as defined in claim 1, wherein said frequency control means includes a noise source for broadening the spectrum of the transmitter signal.

8. An antenna system for a flying body for jamming radio transmitting and receiving devices, comprising:

a plurality of individual signal transmit/receive antennas each having a directional radiation pattern which covers a different azimuth sector when the flying body is in its normal flight attitude;

a common receiver having an input for receiving signals from said antennas and including frequency discriminating means for producing representations of the frequencies of respective received signals;

a common transmitter including a variable frequency oscillator having a frequency control input and an RF output, a frequency control means having an output connected to said frequency control input and a frequency command input, said common transmitter producing a transmitter signal which is an essentially linear amplification of the RF signal produced by the frequency oscillator;

transmit/receive means connected to said common receiver and to said common transmitter for conducting signals received by said antennas to said common receiver and for conducting the transmitter signal from said common transmitter to said antennas;

switch means connected to said transmit/receive means for selectively or cyclically connecting said antennas to said common receiver and to said common transmitter via said transmit/receive means;

timer means connected to said common receiver, said common transmitter and said switch means, said timer means having alternating receive and transmit modes, said timer means enabling said common receiver during the receive mode to receive signals from any of the selected antennas during one complete cycle of said switch means and enabling said common transmitter during the transmit mode for furnishing transmitter signals to any of the selected antennas for at least one complete cycle of said switch means; and memory and processor means being connected for storing the frequency representations from said frequency discriminating means and having an output connected for supplying stored frequency representations to said frequency command input of said frequency control means such that each stored frequency representation corresponds to one of said antennas via which signals were received, said memory means, during a given transmit mode, feeding frequency representations to said frequency command input of said frequency control means which correspond to the antenna currently connected to said common transmitter and which were stored as frequency representations during the previous receive mode, wherein said frequency control means is responsive to the frequency representation received at its frequency command input for tuning said variable frequency oscillator to the frequency indicated by that frequency representation, and wherein said transmit/receive means is a circulator having a residual coupling which couples a portion of the transmitter signal to said frequency discriminating means for the purpose of determining the actual frequency value of the transmitter signal which is to be compared in a correction discriminator against the frequency representation as received at said frequency command input during the transmit mode from said memory means in order to form a closed frequency servo loop whose output is fed to said transmitter, said correction discriminator means producing a correction signal representing the difference between the measured actual frequency of the transmitter signal and the frequency representation read out from said memory means, the correction signal being fed to said frequency control means for adjusting the frequency of said variable frequency oscillator in a closed control loop to compensate for any error between the actual frequency of the transmitter signal and the frequency representation currently fed to said frequency control means.

9. An antenna system for a flying body for jamming radio transmitting and receiving devices, comprising:

a plurality of individual signal transmit/receive antennas each having a directional radiation pattern which covers a different azimuth sector when the flying body is in its normal flight attitude;

a common receiver having an input for receiving signals from said antennas and including frequency discriminating means for producing representations of the frequencies of respective received signals;

a common transmitter including a variable frequency oscillator having a frequency control input and an RF output, a frequency control means having an output connected to said frequency control input and a frequency command input, said common transmitter producing a transmitter signal which is an essentially linear amplification of the RF signal produced by the frequency oscillator;

transmit/receive means connected to said common receiver and to said common transmitter for conducting signals received by said antennas to said common receiver and for conducting the transmitter signal from said common transmitter to said antennas;

switch means connected to said transmit/receive means for selectively or cyclically connecting said antennas to said common receiver and to said common transmitter via said transmit/receive means;

timer means connected to said common receiver, said common transmitter and said switch means, said timer means having alternating receive and transmit modes, said timer means enabling said common receiver during the receive mode to receive signals from any of the selected antennas during one complete cycle of said switch means and enabling said common transmitter during the transmit mode for furnishing transmitter signals to any of the selected antennas for at least one complete cycle of said switch means; and memory and processor means being connected for storing the frequency representations from said frequency discriminator means and having an output connected to the input of said frequency control means such that each stored frequency representation corresponds to one of said antennas via which signals were received, said memory means, during a given transmit mode, feeding frequency representations to said frequency control means which correspond to the antenna currently connected to said common transmitter and which were stored as frequency representations during the previous receive mode, wherein said frequency control means is responsive to the frequency command received at its input for tuning said variable frequency oscillator to the frequency indicated by that frequency representation, wherein said switch means comprises electronic switches actuated by said timer and wherein said timer means is connected and responsive to said memory means such that antennas are selected rather than being uniformly sequentially scanned during the transmitting period.

* * * * *